United States Patent [19]

Shepherd et al.

[11] Patent Number: 5,053,323

[45] Date of Patent: Oct. 1, 1991

[54] OPTICAL INFORMATION MEDIA COMPRISING PHENYL-SUBSTITUTED NAPHTHALOCYANINES AND SYNTHESIS THEREOF

[76] Inventors: James P. Shepherd, 93 Henshaw Ave., Springfield, Union County, N.J. 07081; Palaiyur S. Kalyanaraman, 184 Marian Ave., Fanwood, Union County, N.J. 07023

[21] Appl. No.: 485,679

[22] Filed: Feb. 27, 1990

[51] Int. Cl.$^5$ .................... G03C 1/00; G03C 1/492
[52] U.S. Cl. .................... 430/495; 430/270; 430/945; 369/110; 346/76 L; 346/135.1; 365/108
[58] Field of Search .............. 430/270, 495, 945; 346/135.1, 76 L; 369/110; 365/108

[56] References Cited

U.S. PATENT DOCUMENTS 3,943,369  3/1976  Saeva ................................ 365/108
4,725,525  2/1988  Kenney et al. .................... 430/270

OTHER PUBLICATIONS

Goncharova, G. I., "Phthalocyanines and Related Compounds", translated from Zhurnal Obshchei Khimii, vol. 52, No. 3, pp. 581–584, Mar. 1982.

*Primary Examiner*—Charles L. Bowers, Jr.
*Assistant Examiner*—Ashley I. Pezzner
*Attorney, Agent, or Firm*—P. S. Kalyanaraman

[57] ABSTRACT

Provided is an optical information medium containing an information layer comprised of a 1-phenyl substituted naphthalocyanine. Also provided is a method for easily synthesizing the naphthalocyanine chromophore used in the information layer. The use of such naphthalocyanine chromophores in the information layer of an optical information medium provides one with many advantages. In the manufacture of the medium, these advantages arise due to the increased solubility exhibited by the chromophore in conventional organic solvents. As well, the chromophores exhibit excellent and unique optical properties useful in the recording of optical information.

9 Claims, No Drawings

OPTICAL INFORMATION MEDIA COMPRISING PHENYL-SUBSTITUTED NAPHTHALOCYANINES AND SYNTHESIS THEREOF

BACKGROUND OF THE INVENTION

1. Field of the Invention

This invention relates to a novel optical information medium and the recording of information thereon. More particularly, the present invention relates to an optical information medium, the information layer of which comprises a naphthalocyanine chromophore. The present invention also relates to a synthesis of the naphthalocyanine chromophore.

2. Description of the Prior Art

Optical recording methods in which light from a laser is focused upon the surface of a recording medium with sufficient intensity to cause a detectable change in the physical characteristics of the surface material have been proposed. Among these methods is the establishment of an information pattern of pits. In such methods, the information representative pattern of pits may be formed in the surface of the recording medium by suitably controlling the intensity of the focused light in accordance with the information to be recorded while relative motion is established between the recording medium and the focused light spot.

For instance, in recent years, attention has been increasingly paid to the information recording method in which information is written in a thin film of metal or the like formed on a substrate by using a laser ray or beam. According to such a method, the information recording has been accomplished by forming holes or recesses in the metallic thin film under the action of a thermal energy beam such as a laser ray.

Organic materials have also been employed as the recording layer for optical data storage media, as described by Kuder in the *Journal of Imaging Technology*, Vol. 12, No. 3, pp. 140–143. These are typically thin films comprising either a dye in a polymer matrix, or a dye only. Organic recording layers are often more sensitive to the write laser beam than metal films due both to lower melting or softening temperatures and to low thermoconductivity. While metal films are typically sensitive to a broad spectrum of wavelengths, dyes used in organic media are narrow absorbers that must be carefully chosen so that the absorption matches the laser wavelength employed for writing. This disadvantage has led to a search for chromophores useful in optical data storage media which are sensitive specific to laser wavelengths.

The use of organic materials such as phthalocyanine and naphthalocyanine chromophores in optical recording media is known to the art. For example, the use of phthalocyanine dyes in conjunction with optical recording media comprising a styrene oligomer is disclosed in an article by Kuroiwa et al appearing in the *Japanese Journal of Applied Physics, Vol.* 22, No. 2, February 1983, pp. 340–343. Among the dyes and pigments discussed as being useful is a copper phthalocyanine pigment. The phthalocyanine dye conferred sensitivity to the helium-neon laser beam employed for data storage.

Japanese Patent Application No. 57-173,749, published April 9, 1984, of Kuroiwa et al, discloses an optical recording medium having alleged improved sensitivity. The recording medium comprises a recording layer composed of a polymer having a phthalocyanine residual group as a side chain.

There is described in U.S. Pat. No. 4,241,355 an ablative recording medium comprising a light reflecting layer and a light absorbing layer. This layer which absorbs light at from about 750 to 850 nanometers is comprised of a phthalocyanine pigment optionally substituted on the ring with chlorine, and with a central metal atom selected from the group consisting of lead, aluminum, vanadyl, or tin. Examples of specific pigments disclosed for use in the recording medium described include lead phthalocyanine, chloroaluminumphthalocyanine, vanadyl phthalocyanine, stannic phthalocyanine, or chloro aluminum chloro phthalocyanine. According to the disclosure of the patent, these phthalocyanine compounds all absorb energy at solid state injection laser wavelengths and thus all can be evaporated onto a light reflecting layer to produce smooth, optical quality light absorption layers that form recorded information having high signal-to-noise ratios. The optical recording media disclosed in this patent were prepared by placing a reflective substrate in a vacuum chamber and causing, for example, a phthalocyanine such as lead phthalocyanine to be vacuum evaporated thereon.

There is described in U.S. Pat. No. 4,298,971 an optical recording medium wherein the recording layer consists entirely, or substantially entirely, of a compound of a metal oxide, or metal halide phthalocyanine, vacuum vapor deposited onto a substrate with or without a thin film of chalcogenide of tellurium. Examples of suitable phthalocyanines disclosed include vanadyl phthalocyanine, tin phthalocyanine, nickel phthalocyanine, aluminum phthalocyanine, zinc phthalocyanine, platinum phthalocyanine, and the like.

U.S. Pat. No. 4,529,688 discloses specific phthalocyanine compositions which are sensitive to infrared wavelengths and useful in ablative infrared optical recording devices. Such recording devices contain the infrared phthalocyanine photosensitive organic dyes dispersed in a polymeric resinous binder, and are useful with solid state injection lasers such as the Al-Ga-As laser system.

U.S. Pat. No. 4,458,004, issued July 3, 1984 to Tanikawa, discloses an optical information recording medium comprising a base and recording layer formed on the base. The recording layer comprises a fluorine phthalocyanine capable of absorbing light with a wavelength of 700 nm or more.

U.S. Pat. No. 4,492,750, issued January 8, 1985 to Law et al, discloses an ablative infrared-sensitive optical recording composition containing as a component thereof a dispersion of a resinous binder and a soluble naphthalocyanine.

U.S. Pat. No. 4,725,525 discloses the use of various substituted naphthalocyanine compounds in optical recording media, as does Japanese Kokai No. 177288, published August 8, 1986.

The recording medium, of course, is one of the key elements in any optical recording system, i.e., a system in which the information is recorded or read by light. Such a system would have a usefulness in the storage of audio and video information, data processing and document processing. The commercial viability of an optical recording medium would of course depend upon such technical parameters as the sharpness in recording and playback of the information, i.e., a high signal to noise ratio, as well as the useful life of the information medium. Maintaining the sensitivity of a recording medium throughout the cycles of record-read-erase is also an important consideration.

While dyes or pigments, including naphthalocyanine compounds, have been employed in information storage layers due to their excellent absorption properties, the search for an improved optical information storage medium exhibiting stability and intense absorption at specified wavelengths is continuously ongoing. The search for improved naphthalocyanine compounds for use in such optical storage media, which compounds exhibit improved properties with respect to solubility, etc., is also continuously ongoing. Such improved properties permit greater ease in the manufacture of the optical recording media, and hence can provide a more viable commercial product.

Accordingly, it is a major object of the present invention to provide a novel recording medium which comprises a naphthalocyanine chromophore.

Another object of the present invention is to provide a naphthalocyanine chromophore useful in optical recording media, which chromophore exhibits relatively improved solubility characteristics.

Yet another object of the present invention is to provide a novel process for the synthesis of such naphthalocyanine chromophores.

These and other objects, as well as the scope, nature and utilization of the invention, will be apparent to those skilled in the art from the following description and the appended claims.

SUMMARY OF THE INVENTION

In accordance with the foregoing objectives, there is provided a recording medium containing an information layer comprised of a 1-phenyl substituted naphthalocyanine of the following general formula:

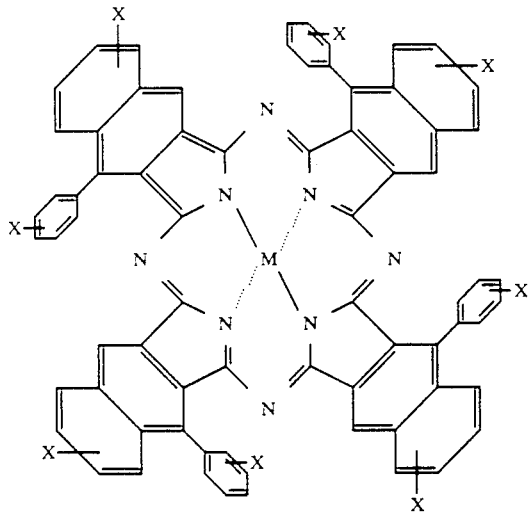

The use of such a naphthalocyanine chromophore in the information layer of an optical information medium provides one with many advantages in the manufacture of the medium. These advantages arise due to the increased solubility exhibited by the chromophore in conventional organic solvents. Advantages are also realized due to the excellent optical properties exhibited by the chromophore.

In another embodiment of the present invention, there is provided a method for easily synthesizing the naphthalocyanine chromophores used in the information layer of the present invention. The process comprises reacting a 1-phenyl-naphthalene-2,3-dicarboxylic anhydride, or the corresponding imide, with a source of carbon dioxide and ammonia, a metallic-reducing agent, and an agent for supplying the central hetero moiety, e.g., a metal acetate, carboxylate or alkoxide. The process allows one to easily prepare the chromophores useful in the optical information media of the present invention.

Information layers containing the chromophores of the present invention can also exhibit unique optical characteristics which permit the writing and reading of optical information using polarized light. Thus, in another embodiment of the present invention, there is provided a method for recording optical information in a medium of the present invention, which comprises irradiating the optical information medium with circularly polarized light in order to effect a conversion of a first optical isomer to a second optical isomer in those areas irradiated to thereby create a local excess of said second optical isomer in said irradiated areas. The information can be read by detecting a change in the polarization state of the reading light as it passes through or is reflected from the information medium.

In another embodiment of the present invention, there is also provided a system for recording optical information, which system comprises
(i) a circularly polarized light source,
(ii) an information medium of the present invention, and
(iii) means for modulating the irradiation of the optical information medium with the circularly polarized light source in accordance with the information to be recorded.

DETAILED DESCRIPTION OF THE PREFERRED EMBODIMENTS

The optical information medium of the present invention contains an information layer which comprises a 1-phenyl substituted naphthalocyanine chromophore. The chromophores are of the general structure:

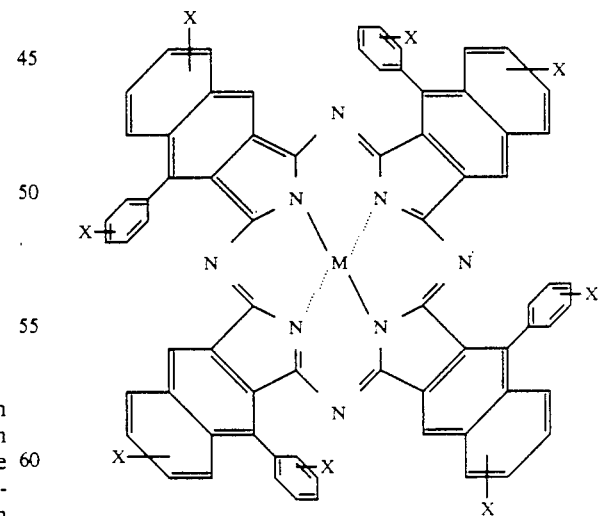

In the foregoing structure, the central hetero moiety M can be comprised of a transition metal, or a Group IVA element. It is most preferred that the central hetero moiety M is comprised of either zinc, copper or nickel.

The central moiety M can be the element itself, or it can comprise a complex if a particular element or form of element is used for which valences need to be satisfied. Examples of suitable groups for complexing with the central moiety are, without limitation, the halides, carboxylates, alkoxides, protonated alkoxides (e.g., alcohols), divalent oxygen radicals, hydroxy, siloxy (e.g., $OSiR_1R_2R_3$, wherein $R_1$, $R_2$ and $R_3$ can be the same or different and can be alkyl having from 1 to about 18 carbons; aryl having from 6 to 10 carbons; cycloalkyl having at least 4 carbons; siloxy; or alkoxy having at least 3 carbons), thiolates and amines. The presence of the complexing groups in general lends stability to the naphthalocyanine compounds of the present invention by satisfying valences.

The X substituents off of the naphthyl rings and/or the phenyl substituents, can be the same or different. By choosing a particular X substituent, in combination with a particular central hetero moiety M, the solubility and absorption properties of the naphthalocyanine chromophore can be effected. The particular position and choice of the X substituents can be easily manipulated by proper choice of the starting material used in preparing the chromophore material in accordance with the synthesis of the present invention.

The X substituents are preferably a hydrogen, halogen, nitro, alkyl (preferably having from 1 to 5 carbon atoms), or an alkoxy (preferably having from 1 to 5 carbon atoms) group. In the most preferred embodiment of the present invention, the X substituent, which can be the same or different, is a halogen or alkoxy substituent. Mixtures of the foregoing substituents can be utilized to achieve a desired effect.

The use of these chromophores in an optical information medium allows for the intense absorption of light within a wavelength range of about 750 nm to about 850 nm. The optical properties of the chromophores are excellent and provide one with a most stable, sensitive and efficient optical information medium. Moreover, the improved solubility characteristics exhibited by the 1-phenyl substituted naphthalocyanine chromophores of the present invention permit easy manufacture of the optical information medium. The chromophores exhibit improved solubility in conventional organic solvents, thereby permitting one to use less expensive and more readily available solvents in the manufacture of the medium. The improved solubility can also ensure a more consistent application of the information layer.

In using the chromophores, it is preferred that the chromophores of the present invention be cast from solution. The chromophores can be used as a one-component material, i.e., chromophore only material, or used in combination with a polymer. Thus it is preferred to either cast a chromophore layer or coat a substrate with a polymer/chromophore film. Conventional methods of casting may be utilized with the chromophores of the present invention.

Since the read and write steps all require operating within a very narrow depth of focus, the film, when applied, must provide a very flat surface in order to avoid errors and noise. In order to facilitate the coating procedure, the polymer, if used, and chromophore should be compatible and mutually cosoluble. Also, upon evaporation of the solvent, the chromophore should not precipitate in a particulate form, which particulates would cause a scattering of light.

Any suitable coating technique may be used to achieve such a flat surface, with a conventional technique such as spin coating, which allows for a high degree of control of film thickness and flatness, being preferred. It is, of course, important that the polymer form a thin film coating.

The substrate which is coated with the material should generally possess a surface of suitable smoothness. This may be imparted by appropriate molding or other forming techniques when the substrate is made. If the substrate has an inadequately smooth surface, a smoothing or subbing polymer layer may be used to attain the appropriate smoothness. Such smoothing or subbing layer should not, of course, interfere with the application or utilization of the recording layer which is subsequently applied thereto. The subbing layer can contain preformatting information. A preferred subbing layer is a layer of polyvinyl alcohol or an acrylate formulation. The substrate may be optically featureless or may contain preformatting information (e.g., tracking groove and/or encoded information in the form of readable marks).

The material of which the substrate is comprised is generally a material exhibiting good mechanical strength and good structural integrity against warping. Examples of suitable materials include aluminum, glass, reinforced glass, ceramics, polymethacrylates, polyacrylates, polycarbonates, phenolic resins, epoxy resins, polyesters, polyimides, polyether sulfones, polyether ketones, polyolefins, polyphenylene sulfide and nylon. Polycarbonate is a preferred material for use as a substrate. Furthermore, the shape and size of the substrate, and hence the recording medium, can vary depending on the application. The shape and format, for example, may be a disk, tape, belt or drum. A disk shape or tape format is most preferred.

The actual structure of the recording medium itself may also vary in that the recording layer may be coated on one side or both sides of the substrate. Or, two substrates having the recording layer on either side can be combined allowing the sides having the recording layers to face each other at a constant distance, the combined substrates being sealed to prevent dust contamination and scratches.

The medium of this invention may also have an undercoating layer such as a metal reflective layer or layer of various resins on the substrate if necessary, with the recording layer being coated over it. In addition, various thermoplastic resins, thermosetting resins, UV or electron beam cured resins, may be used as an undercoating material. Furthermore, it is possible to laminate layers from the substrate as follows: a reflective layer, undercoating layer and recording layer. In addition, guiding grooves may be installed on the substrate, and the recording layer may be installed on the extruded portions and/or intruded portions of the grooves. Furthermore, if necessary, a reflective layer or opaque layer may be installed over the recording layer.

A suitable protective layer or cover, such as those known to the art, can also be used if desired to protect the recording layer from dirt, dust, scratches or abrasion.

In addition to the chromophore material or polymer/chromophore material, the recording layer may also contain other polymers or oligomers, various plasticizers, surfactants, antistatic agents, smoothening agents, flame retardants, stabilizers, dispersants, leveling agents, antibleeding agents, antioxidants, water repellants, emulsifiers, etc. as may be desired. The effect the presence of such additives may have on the optical properties of the medium, however, should be taken into account.

In another embodiment of the present invention, there is provided a method for synthesizing the 1-phenyl substituted naphthalocyanine chromophores used in the information layers of the present invention. This synthesis comprises reacting a 1-phenyl-naphthalocyanine-2, 3-dicarboxylic anhydride, or its corresponding imide, with
(i) a source of carbon dioxide and ammonia,
(ii) a reducing agent, e.g., a metallic reducing agent such as zinc, and
(iii) an agent for supplying the central hereto moiety, e.g., a metal acetate, carboxylate or alkoxide.

The 1-phenyl-naphthalene-2, 3-dicarboxylic anhydride can be prepared by the condensation of a propiolic acid with acetic anhydride. Propiolic acids are commercially available, or can be readily made in accordance with the following reaction scheme:

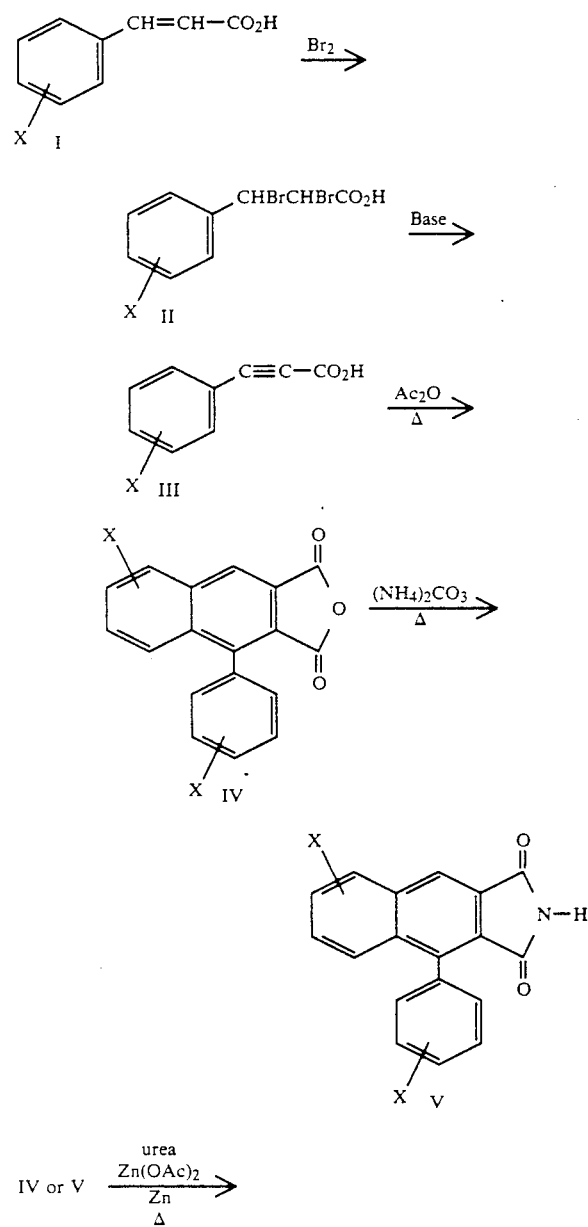

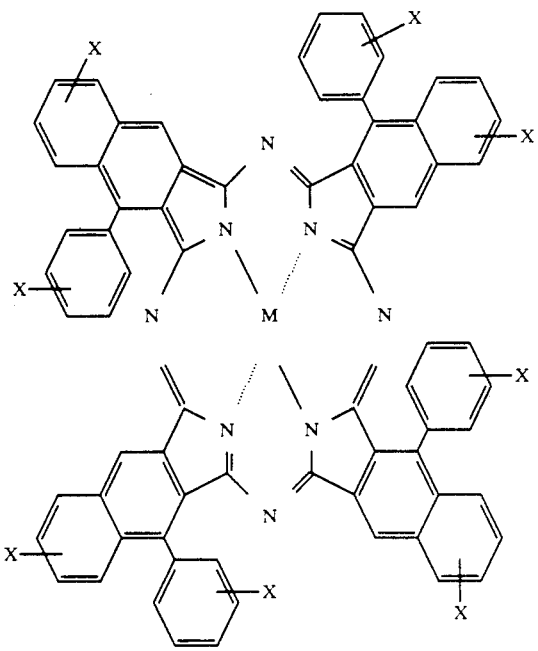

As can be seen from the foregoing reaction scheme, the propiolic acid III can be prepared starting with the bromination of compound I, and with the reaction progressing through compound II and its reaction with a base. The propiolic acid III can then be heated in the presence of acetic anhydride to provide the anhydride IV. Upon reaction with ammonium carbonate (and heat), the anhydride can be converted to the corresponding imide V. The 1-phenyl substituted naphthalocyanines of the present invention can then be easily prepared upon reacting either the anhydride IV or the imide V with a source of carbon dioxide and ammonia, a reducing agent and an agent for supplying the central hetero moiety.

In the foregoing schematic, the source of carbon dioxide and ammonia employed in the reaction is urea. This is the most preferred source for use in the synthesis of the subject invention. Other sources can be used as will be apparent to the skilled artisan. The use of urea, however, is preferred for practical purposes, i.e., availability and ease of use.

The reducing agent employed in the above schematic is zinc. Zinc is generally used in the form of zinc dust, and is the most preferred reducing agent for use in the synthesis of the present invention. Other metallic reducing agents can also be employed.

The zinc acetate in the above schematic is the agent for supplying the central hetero moiety, which in this case is elemental hetero atom zinc. Other metal acetates can be used, as well as silicon tetraacetate to provide a silicon central hetero atom. Besides acetates, carboxylates or alkoxides can be used, e.g., zinc ethoxide. The positioning of the X substituents is determined based upon the position of said substituents in the anhydride or imide reactant. This position can be determined by choosing an appropriate propiolic acid. The substitution patterns resulting from the reaction of a substituted propiolic acid with acetic anhydride to provide the anhydride IV is given in the following scheme:

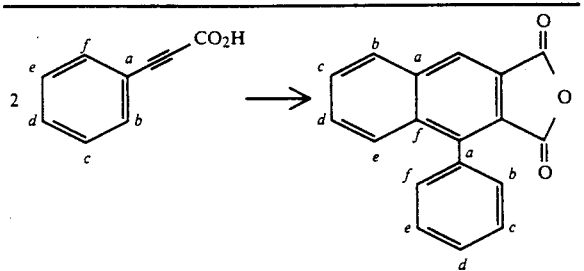

| SUBSTITUTION PATTERNS | | |
| --- | --- | --- |
| Propiolic Acid | (1-Phenyl) | Napthalene |
| 2- | 2- | 5- |
| 3- | 3- | 6- |
| 4- | 4- | 7- |
| 2,3- | 2,3- | 5,6- |
| 2,5- | 2,5- | 2,8- |

Following the foregoing substitution pattern, one can prepare compounds of choice, with the substituents of choice.

It should be further noted that by using a mixture of propiolic acids having different substituents, anhydrides IV can be prepared wherein the X substituents involve a mixture of substituents. For example, if the propiolic acid III reacted with the acetic anhydride involved a mixture of brominated propiolic acid and chlorinated propiolic acid, the anhydrides IV obtained would involve some anhydrides where both of the X substituents are chlorine, some where both of the X substituents are bromine, and some where one X substituent is chlorine and one X substituent is bromine. Using this general procedure, one can prepare other anhydrides IV having a mixture of substituents.

The nature of the specific 1-phenyl substituted naphthalocyanine chromophores employed in the present invention also uniquely permit the writing and reading of optical information using polarized light. The naphthalocyanine chromophores of the present invention can be optically active, and can interconvert between the two optical isomers via a photochemical process. Thus, the use of the photochiroptical effect is possible to effect the writing and reading of optical information as described in commonly assigned and co-pending U.S. Application Ser. No. 486,031 filed on Feb. 27, 1990. The photochiroptical effect relates to the ability of light to distinguish between the two optical isomers, i.e., enantiomers. Circularly polarized light is therefore used to selectively photo-isomerize the R or the S isomer in order to write information. The photo-isomerization leads to a change in the distribution of optical isomers, with the reading of the recorded information being based on the ability of the system to detect this change as a change in the optical activity of the medium.

More specifically, in each case of optical activity of a compound, there are two and only two isomers called enantiomers, the R isomer and the S isomer. These enantiomers interact with light differently. This is to say that the R isomer will preferentially absorb one sense of circularly polarized light (for the sake of this discussion, LCP), while the S isomer will preferentially absorb the opposite sense of circularly polarized light (RCP). Consider a racemic mixture (50/50) of the R and S isomer. A LCP beam incident on the medium would be preferentially absorbed by the R isomer. If this absorption leads to some photochemistry, then the R isomer would undergo the photochemical reaction to a greater extent than the S isomer. Alternatively, a RCP beam would be preferentially absorbed by the S isomer and the S isomer would undergo the photochemical reaction to an extent greater than the R isomer. This ability of circularly polarized light to selectively photo-isomerize the R or the S isomer is the basis for writing information using the photochiroptical effect.

The photo-isomerization leads to a product where the distribution of R isomer and S isomer has been changed in the area irradiated. This change may be read as a change in the optical activity for the medium. Thus, the photochiroptical effect can be used to record information by selective photo-isomerization of one of the two optical isomers to give a local change in the optical activity for the medium which can be read as a polarization state change by a transmitted or reflected read light.

More specifically, reading of the information is a detection of the change in optical activity in those spots irradiated, which detection can be made with linear or circular polarized light. Due to a different complex refractive index for LCP and RCP, a dfference in the reflectance for LCP and RCP arises. Therefore, the light reflected from an optically active medium would exhibit relative polarization changes that can be used for a read scheme.

For the chromophores of the present invention, restricted rotation about the phenyl-naphthyl bond results in geometries in which optically active isomers are realized. Since the energy barrier to rotation in compounds of this type is substantially lower in the excited state than in the ground state, photochemical interconversion between the isomers can occur. Thus, consider an information layer in an optical information medium which comprises a racemic mixture of optical isomers of a 1-phenyl substituted naphthalocyanine compound of the present invention (i.e., 50% R isomer and 50% S isomer). Upon irradiation by a focused circularly polarized laser beam, a mark is made that consists of a local excess of one of the optical isomers, e.g., the S isomer. This mark, i.e., information bit, is now locally optically active. A continuous polarized laser beam then scans the medium, and the polarization state of the reflected beam is monitored. As the beam scans across the mark, there will be a change detected in the polarization state for the reflected beam relative to the unwritten region. The ability to detect the polarization state changes in either reflected or transmitted light, as the light interacts with the medium, is the basis for reading information.

In a preferred embodiment, the present invention uniquely uses circularly polarized light to write data on an information layer comprised of a racemic mixture of an optically active 1-phenyl substituted naphthalocyanine by generating an excess of one optical isomer. One may write using either LCP or RCP to give data marks that comprise an excess of one optical isomer or the other depending on the polarization of the write beam.

This also provides one with the ability to utilize a three state (ternary) optical data storage scheme where the three states would be:
(i) racemic (50% R and 50% S),
(ii) excess R isomer, and
(iii) excess S isomer.

In the ternary storage scheme, the "racemic" state is transformed to the "excess R isomer" state by writing with one polarization of circularly polarized light. Alternatively, the "racemic" state may be transformed to an "excess S isomer" state by writing with the opposite polarization of circularly polarized light.

Such a ternary data storage scheme provides advantages over binary data storage schemes. In binary data storage a data address may contain either a 0 or a 1. However, in the ternary data storage scheme provided here, a data address may contain −1, 0, or +1. Therefore ternary data storage provides increased data storage capacity because each data address contains more information than for binary data storage.

Thus, the 1-phenyl substituted naphthalocyanine chromophores of the present invention can be utilized in a more conventional pit-forming type of system, or in a system utilizing polarized light.

The following examples are provided in order to further illustrate the present invention. The examples are in no way meant to be limitative, but merely illustrative.

EXAMPLE 1

1.0 g. of 1-(2-chlorophenyl)-5-chloro-2,3-naphthalimide was ground together with 4.0 g. of urea, 1.0 g. of zinc acetate and 0.10 g. of zinc dust. The ground mixture was then added to a Schlenck tube equipped with an argon purge and wrapped with heater tape. The tube was then heated to about 350° C. for 2 hours, and subsequently cooled to room temperature. The resulting brown solid was then rinsed with hot water and filtered using a fitted glass filter, under vacuum.

The product was purified by chromatography, and IR and UV analysis indicated the product to be zinc tetra (2′, 5-dichloro-1-phenyl)naphthalocyanine. The yield was about 56 mole % of theory.

EXAMPLE 2

1.784 g. of phthalimide, 8.05 g. of urea, 2.01 g. of zinc acetate and 0.15 g. of zinc dust were ground together. The ground mixture was then added to a Schlenck tube equipped with an argon purge and wrapped with heater tape. The tube was then heated to 350° C. for about two hours, and then cooled to room temperature. The resulting black solid was extracted with acetone overnight, and the product recovered.

The product was purified by column chromatography using silica gel and acetone as the solvent. UV analysis indicated the product to be zinc tetra-1-(2′-chlorophenyl)-5-chloro-2,3-naphthalocyanine. The purified yield was about 35%.

EXAMPLE 3

2.36 g. of 5′-methoxy-1-(1′-methoxyphenyl)-2,3-naphthalimide, 10.65 g. of urea, 2.65 g. of zinc acetate and 0.20 g. of zinc dust were ground together. The mixture was added to a Schlenck tube equipped with an argon purge and wrapped with heater tape. The tube was heated to 300° C. and maintained at this temperature for about 1.5 hours. After cooling to room temperature, the resultinq black solid product was extracted with acetone. The crude yield was about 81%.

The product was then purified by column chromatography using silica gel and acetone as the solvent. UV analysis indicated the product to be zinc tetra-1-(2′-methoxyphenyl)-5-methoxy-2,3-naphthalocyanine. The purified yield was about 19.2%.

EXAMPLE 4

Zinc tetra-1-(2′-chlorophenyl)-5-chloro-2,3-naphthalocyanine was prepared from the anhydride as follows.

1.0 g. of 1-(2-chlorophenyl)-5-chloro-2,3-naphthalene dicarboxylic anhydride, 8.0 g. of urea, 1.2 g. of zinc acetate and 1.0 g. of zinc dust were mixed together. This mixture was then added to a Schlenck tube equipped with an argon purge and wrapped with heater tape, heated at a temperature of about 350° C. for two hours, and then cooled to room temperature. The resulting black solid was extracted with acetone. UV analysis was performed on the crude product to confirm the presence of the naphthalocyanine product.

EXAMPLE 5

Copper tetra-(1-phenyl)naphthalocyanine was prepared according to the following procedure.

In a 50 ml Schlenck tube wrapped with heating tape, a mixture of 12 gms. of ammonium carbonate and 2 gms. of 1-phenyl-2,3-naphthalene dicarboxylic anhydride was heated under argon at 240° C. for about 90 minutes. The material was then cooled and 1.87 gms. of 1-phenyl-2,3-naphthalimide was collected, Mpt. 238° C.

The imide was ground together with 8 gms. urea and 2 gms. copper acetate (Cu II), with the ground mixture then being place in a Schlenck tube purged with argon. The mixture was heated at 300° C. for about one hour, and at 330° C. for an additional hour. The residue was cooled and then extracted with toluene. A UV spectrum of the extract confirmed the product. A total of 0.3 gms. pure product was collected, yield 16.2%.

While the invention has been described with preferred embodiments, it is to be understood that variations and modifications may be resorted to as will be apparent to those skilled in the art. Such variations and modifications are to be considered within the purview and the scope of the claims appended hereto.

What is claimed is:

1. A method of recording optical information in an optical information medium, which method comprises
   (i) providing an optical information medium containing an information layer comprised of a mixture of optical isomers of a 1-phenyl-substituted naphthalocyanine compound of the general formula:

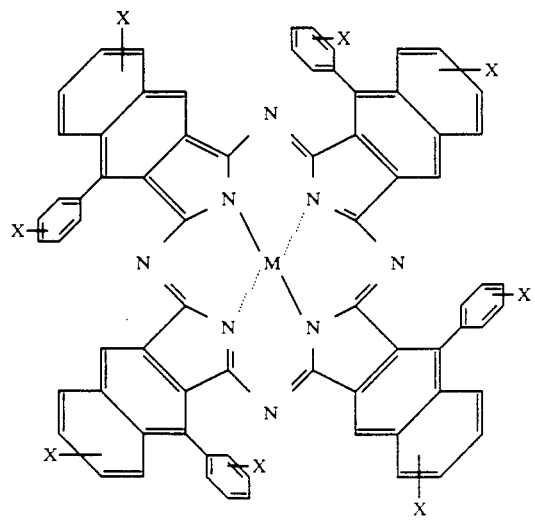

wherein, M represents a central hetero moiety comprised of a transition metal or a Group IVA element, and X represents a substituent which can be the same or different, and is a hydrogen, halogen, nitro, alkyl or alkoxy group, and (ii) irradiating the optical information medium with circularly polarized light in order to effect a conversion of a first optical isomer to a second optical isomer in those areas irradiated to thereby create a local excess of said second optical isomer in said irradiated areas.

2. The method of claim 1, wherein the central hetero moiety M is comprised of zinc, copper or nickel.

3. The method of claim 2, wherein the central hetero moiety M is elemental zinc.

4. The method of claim 1, wherein X represents a halogen or an alkoxy.

5. The method of claim 3, wherein X represents a halogen or an alkoxy.

6. The method of claim 1, wherein the mixture of optical isomers is a racemic mixture.

7. The method of claim 3, wherein the mixture of optical isomers is a racemic mixture.

8. A system for recording optical information, which system comprises (i) circularly polarized light source,
(ii) an optical information medium which comprises an information layer, wherein the information layer is comprised of a 1-phenyl substituted naphthalocyanine of the general formula:

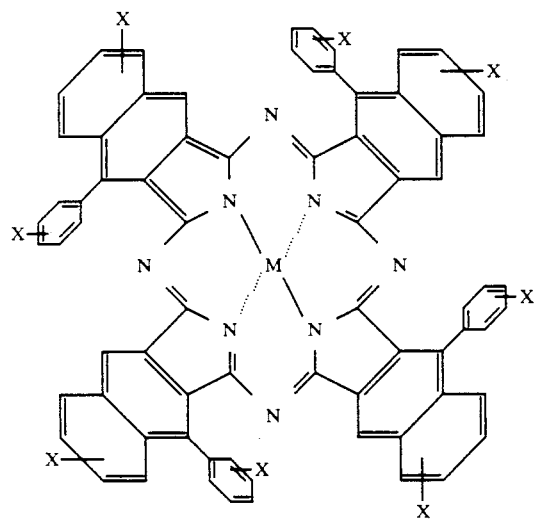

wherein M represents a central hereto moiety comprised of a transitional metal or a Group IVA element, and X, which can be the same or different, represents a hydrogen, halogen, nitro, alkyl, or an alkoxy group, such that the X substituents enable the formation of optical isomers on said naphthalocyanine, and said optical isomers can selectively interact with circularly polarized light to form a distinguishable product, and which product is distinguishable from its precursor on the basis of optical activity, and (ii) means for modulating the irradiation of the optical information medium with the circularly polarized light source in accordance with the information to be recorded.

9. A system for recording optical information, which system comprises (i) a circularly polarized light source,
(ii) an optical information medium which comprises an information layer, wherein the information layer is comprised of a racemic mixture of optical isomers of 1-phenyl substituted naphthalocyanine of the general formula:

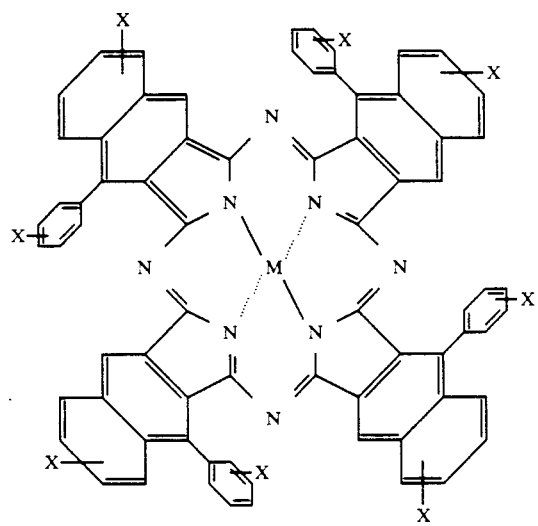

wherein M represents a central hereto moiety comprised of a transitional metal or a Group IVA element, and X, which can be the same or different, represents a hydrogen, halogen, nitro, alkyl, or an alkoxy group, such that the X substituents enable the formation of optical isomers on said naphthalocyanine, and said optical isomers can selectively interact with circularly polarized light to form a distinguishable product, and which product is distinguishable from its precursor on the basis of optical activity, and (iii) means for modulating the irradiation of the optical information medium with the circularly polarized light source in accordance with the information to be recorded.

* * * * *